United States Patent
Hoos

(10) Patent No.: US 11,022,310 B2
(45) Date of Patent: Jun. 1, 2021

(54) COMBUSTION CYCLE PROCESS

(71) Applicant: Frank Hoos, Mijnsheereniand (NL)

(72) Inventor: Frank Hoos, Mijnsheereniand (NL)

(73) Assignee: Frank Hoos, Mijnsheerenland (NL)

( * ) Notice: Subject to any disclaimer, the term of this patent is extended or adjusted under 35 U.S.C. 154(b) by 870 days.

(21) Appl. No.: 15/304,642

(22) PCT Filed: Apr. 17, 2015

(86) PCT No.: PCT/EP2015/000805
§ 371 (c)(1),
(2) Date: Oct. 17, 2016

(87) PCT Pub. No.: WO2015/158435
PCT Pub. Date: Oct. 22, 2015

(65) Prior Publication Data
US 2017/0045230 A1    Feb. 16, 2017

Related U.S. Application Data

(60) Provisional application No. 61/980,764, filed on Apr. 17, 2014.

(51) Int. Cl.
| | |
|---|---|
| *F23R 3/26* | (2006.01) |
| *F02G 5/02* | (2006.01) |
| *F02C 1/05* | (2006.01) |
| *F02C 7/08* | (2006.01) |
| *F02C 6/16* | (2006.01) |
| *F23R 3/28* | (2006.01) |

(52) U.S. Cl.
CPC ............. *F23R 3/26* (2013.01); *F02C 1/05* (2013.01); *F02C 6/16* (2013.01); *F02C 7/08* (2013.01);
(Continued)

(58) Field of Classification Search
CPC ...... F23R 3/26; F23R 3/28; F02C 6/16; F02C 7/08; F02C 1/05; F02G 5/02; Y02E 60/15; Y02T 10/166
See application file for complete search history.

(56) References Cited

U.S. PATENT DOCUMENTS

| | | |
|---|---|---|
| 4,656,984 A | 4/1987 | Southard |
| 4,702,074 A | 10/1987 | Munk |

(Continued)

FOREIGN PATENT DOCUMENTS

| | | |
|---|---|---|
| JP | S61140125 U | 8/1986 |
| JP | H08296447 A | 11/1996 |

(Continued)

OTHER PUBLICATIONS

International Search Report and Written Opinion for International application No. PCT/EP2015/000805, dated Aug. 14, 2015.

(Continued)

*Primary Examiner* — Hung Q Nguyen
(74) *Attorney, Agent, or Firm* — Steven M. Koehler; Westman, Champlin & Koehler, P.A.

(57) ABSTRACT

An aspect of the present disclosure is a process for generating work, in particular via a combustion cycle. The process comprises the steps of compressing an oxidator, e.g. air. The process further comprises mixing the oxidator with a reductor, in particular a fuel, e.g. hydrocarbons such as petrol, kerosene, and diesel and causing the mixture to ignite, e.g. by means of a spark or (compression) heat. The process further comprises allowing the ignited mixture to expand, generating work, exchanging heat between the expanded and combusted mixture and the compressed oxidator, and exhausting the expanded and combusted mixture.

20 Claims, 4 Drawing Sheets

(52) U.S. Cl.
CPC .................. *F02G 5/02* (2013.01); *F23R 3/28* (2013.01); *Y02E 60/16* (2013.01); *Y02T 10/12* (2013.01)

(56) References Cited

U.S. PATENT DOCUMENTS

| | | | | |
|---|---|---|---|---|
| 5,680,764 | A * | 10/1997 | Viteri | F01K 21/047 60/716 |
| 5,934,076 | A * | 8/1999 | Coney | F02G 1/044 60/617 |
| 6,463,731 | B1 | 10/2002 | Warren | |
| 8,980,192 | B2 | 3/2015 | Maslov | |
| 2004/0128975 | A1* | 7/2004 | Viteri | F01K 25/005 60/39.55 |
| 2013/0236370 | A1 | 9/2013 | Maslov | |
| 2014/0230778 | A1* | 8/2014 | Grannell | F02M 25/038 123/25 P |
| 2014/0325981 | A1* | 11/2014 | Rabhi | F02B 37/164 60/600 |
| 2015/0113995 | A1 | 4/2015 | Maslov | |

FOREIGN PATENT DOCUMENTS

| | | |
|---|---|---|
| JP | 2002147262 A | 5/2002 |
| JP | 2005098244 A | 4/2005 |
| JP | 2006316718 A | 11/2006 |
| JP | 2007239553 A | 9/2007 |
| JP | 2008280961 A | 11/2008 |
| JP | 2010500163 A | 1/2010 |
| JP | 2010163975 A | 7/2010 |
| JP | 2010275965 A | 12/2010 |
| JP | 2013181519 A | 9/2013 |
| JP | 2014178267 A | 9/2014 |
| RU | 2440499 C1 | 1/2012 |
| WO | 2013139103 A1 | 9/2013 |
| WO | 2014010355 A1 | 6/2016 |

OTHER PUBLICATIONS

Japanese Office Action, dated Feb. 4, 2019 for corresponding Japanese Patent Application No. 2017505708, filed Oct. 14, 2016.
Japanese Office Action in corresponding Japanese Patent Application No. 2020-081990, dated Feb. 22, 2021.

* cited by examiner (*) autoignition,
(**) minimum autoignition temperature,
1 poor mixtures not propagating flames,
2 mixtures propagating flames,
3 rich mixtures not propagating flames,
4 slow reaction.

COMBUSTION CYCLE PROCESS

The present application is a national stage of and claims priority of International patent application Serial No. PCT/EP2015/000805, filed Apr. 17, 2015, and published in English, and claims the benefit of U.S. provisional patent application Ser. No. 61/980,764, filed Apr. 17, 2014, the contents of both of which are hereby incorporated by reference in their entirety.

BACKGROUND OF THE INVENTION

1. Field of the Invention

The present invention is directed to the field of generating work. In particular the field of the invention is directed to combustion cycles.

2. Description of the Related Technology

Transport volume and movement of people and materials is growing exponentially by increasing prosperity of western countries and rapid industrialization of other countries.

Movements and numbers of ships, planes, cars, trains and lorries are increasing by the day, these vehicles are mainly powered by fossil fuels and the demand for fossil fuels is increasing accordingly.

Analysis of the combustion cycle of petrol in diesel engines shows that their performance is poor. Mr. Sadi Carnot (1796-1832) had discovered that the conversion of heat to work was only dependent on the temperature difference between the so-called "source" and "sink". The heat source in a combustion engine is the increase of the air temperature resulting from combustion of hydrocarbons in the cylinders of the engine.

The combustion temperature easily increases to temperatures of 1600° C. (1873K) or even higher. The maximum theoretical conversion rate of hydro carbon fired engines is even more than 69%, however in practice it is found that this figure is not met or not even approached. The maximum conversion rate of a very well performing diesel is not much higher than 42%, a petrol fired engine does not perform better than 30%.

SUMMARY OF THE INVENTION

An aspect of the present invention is a process for generating work via a combustion cycle.

An aspect of the present disclosure is a process for generating work, in particular via a combustion cycle. The process comprises the steps of compressing an oxidator, e.g. air. The process further comprises mixing the oxidator with a reductor, in particular a fuel, e.g. hydrocarbons such as petrol, kerosene, and diesel and causing the mixture to ignite, e.g. by means of a spark or (compression) heat. The process further comprises allowing the ignited mixture to expand, generating work, exchanging heat between the expanded and combusted mixture and the compressed oxidator, in particular heating compressed oxidator with heat from the expanded and combusted mixture, and exhausting the expanded and combusted mixture.

DETAILED DESCRIPTION OF THE PREFERRED EMBODIMENT(S)

Figure 1:
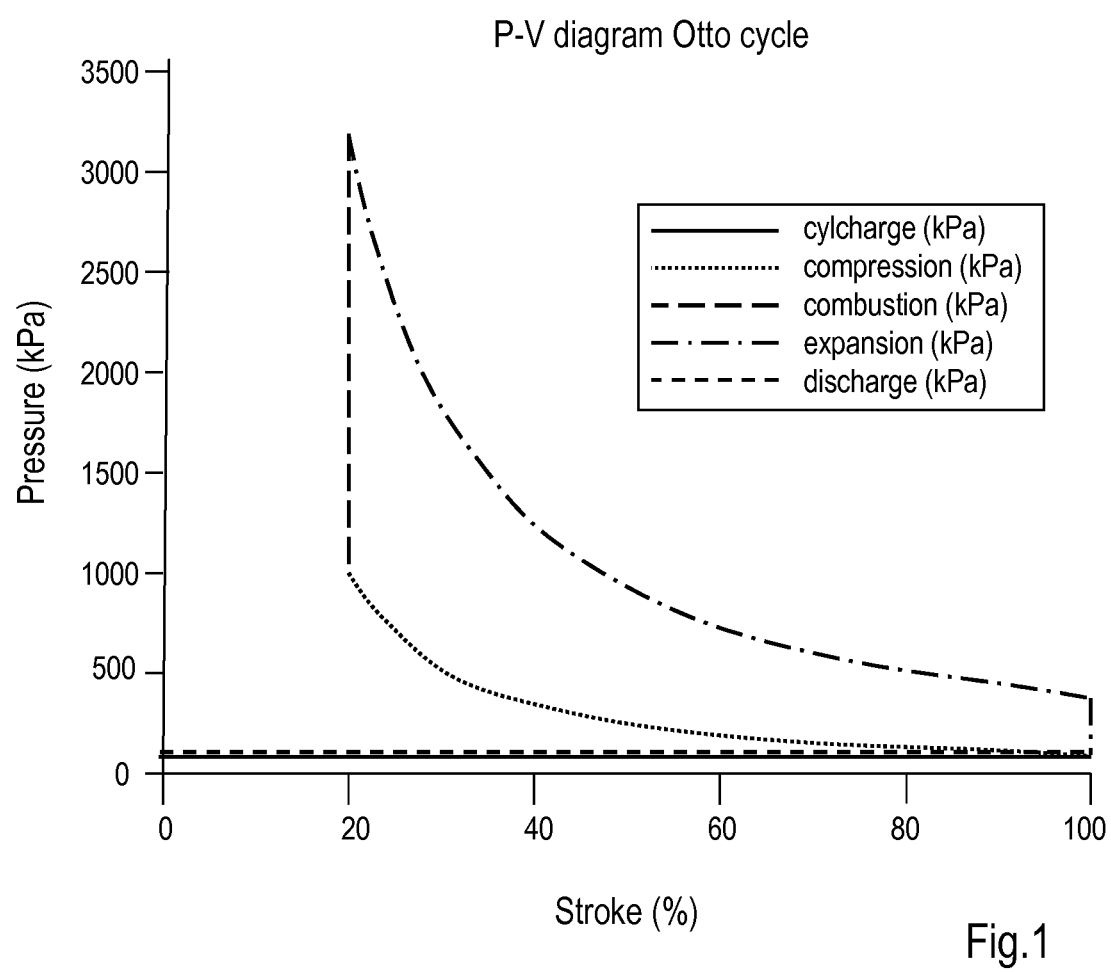
FIG. 1 shows a P-V diagram of the Otto cycle.

For illustrative purposes, the principles of the present disclosure are described by referencing various exemplary embodiments. Although certain embodiments are specifically described herein, one of ordinary skill in the art will readily recognize that the same principles are equally applicable to, and can be employed in other systems and methods.

Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel methods are therefore not limited to the particular arrangement of steps disclosed herein.

It must be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

In this document, the Diesel cycle and Otto cycle (cycle in a petrol engine) are analyzed and the limiting factors are determined. Another newly developed combustion cycle is presented; this alternative cycle converts much more heat to work; e.g. approximately twice as much as the Diesel cycle and e.g. about three times as much as the cycle in a petrol fired engine.

An advantage of the new conversion cycle is that many parts of existing engines can be used for the construction of the new engine. One element in a preferred construction of the new engine is the use of ceramic material.

The conversion rate (heat to work) of a diesel engine is max 40%, the conversion rate of a petrol engine is less than 30% The maximum theoretical conversion rate (1873 K combustion temperature and 300 K environmental temperature) is calculated at 84%.

Coefficient of performance=($T$ high–$T$ low)/($T$ high)

Most heat generated by combustion disappears via water cooling and exhaust gasses instead of being converted to work by the engines at present. This is caused by a mismatch of explosion limits, heat of combustion and the heat capacity of air.

The combustion heat of hydrocarbons is much more than the air in the cylinder is able to absorb within the temperature and explosion range, this in particular with the Otto cycle.

Explosion limits are widening at higher temperatures. The amount of air and combustion heat can be matched at (much) higher temperatures. This feature allows heating the intake air by the heat of the exhaust gasses and that results in reduction of fuel at comparable high combustion temperatures. In an embodiment, the new type engine is a two stroke reducing the proportional friction, compression of intake air is accomplished by turbo units with the air flow in series. The turbo compressor is powered by the pressure and volume of the exhaust gasses alternatively by a mechanical driven compressor. The calculated conversion rate of the new engine is approximately 65%, this figure is related to a cycle calculated with all losses except for mechanical friction loss.

In this document the new type of combustion cycle is described. This new combustion cycle named the "Hoos cycle" has a much higher efficiency as the "Otto cycle" or the "Diesel" cycle.

The Otto cycle, shown in FIG. 1, was developed by Nikolaus August Otto (1832-1891). Otto had built together with E. Langen in 1864 an engine running on gas, Mr. Otto came in 1876 with an engine with spark ignition. The "Otto Cycle" is nowadays identified with all types of two or four stroke engines running on petrol or gas fuel mixtures.

The Diesel cycle was developed by Rudolf Diesel (1858-1913); the efficiency of the diesel engine was only a small part of what Mr. Diesel had in mind, however substantial higher as with the Otto cycle. The principles of the diesel engine differs from the Otto principles, the compression of air in the diesel engine is such that the air temperature of the compressed air increases to a level whereby the (diesel) fuel injected in the cylinder is spontaneously ignited and spark ignition is not required.

A fast analysis learns that the thermodynamic performance of both cycles is very poor related to the theoretically reachable performance. At a combustion temperature of 1873 K (1600° C.) and an environmental temperature of 300K (27° C.), the theoretical conversion from heat to work in accordance with the Carnot limit is calculated at 84%.

The conversion rate of a well performing diesel engine is not much higher than 42% and the conversion rate of a well performing petrol engine is less than 30%. Both cycles are performing far less than theoretically could be possible. The heat of the hot gas heated by fuel combustion disappears via cooling systems and the remaining heat content of the exhaust gasses instead of being converted to work.

Figure 2:
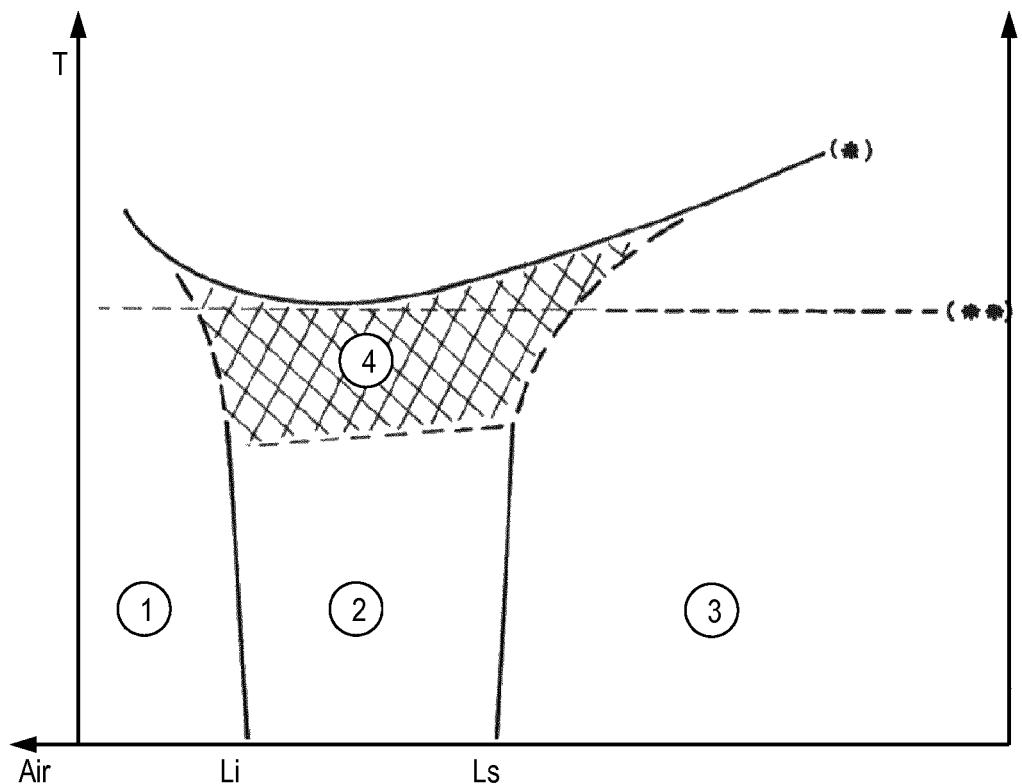
FIG. 2 is a diagram illustrating explosion limits.

This is different with the new cycle as described in this document. The ultimate temperature of exhaust gasses of the new cycle is just above environmental temperature level and hardly any engine cooling is required with the new type of engine. The combustion cycle of the new engine allows for any type of fuel, from gas type of fuel to all kind of liquid fuels including the whole range of bio fuels. The low rate of conversion from heat to work with a combustion engine based on the Otto or diesel principles is resulting from the heat that is lost via the cooling system and exhaust gasses. This heat loss is caused by the dilemma of combustion heat and explosion limits of the fuel; this is explained by the following argumentation:

Combustion of an air/fuel mixture only takes place if the percentage of the (vaporized) fuel and air is within certain limits, the so called explosion limits. If the fuel percentage is too high (rich mixture) or to low (lean mixture) the combustion does not propagate, a high temperature ignition source brought in the mixture will not result in combustion. This is illustrated in FIG. 2. A (too) rich mixture at the limit of combustion will produce many noncombusted components like carbon monoxide, a lean mixture at the limit will only partly and locally ignite in the combustion chamber. The explosion limits of petrol are 1-7% in volume, but the optimal mixture can also be theoretically calculated.

Petrol consists of many different types of hydrocarbon molecules. The average composition of petrol (alkenes) can be simplified by the general chemical formula CnH2n+2, however there are also cyclic and unsaturated hydrocarbon molecules in the petrol mix present, in this calculations it is assumed that the average composition is $C_nH_{2n}$, for petrol "n" is eight, the (average) chemical formula of petrol is assumed to be $C_8H_{16}$, the molecular weight is calculated with:

(C=12 and H=1); 8*12+16*1=96+16=112

Combustion of $C_8H_{16}$:

Every mole (in the gaseous state) possesses an equal volume (22.4 liter at 1 bar and 0° C.). One mole C8H16 requires theoretically twelve moles $O_2$ for combustion. Atmospheric air consists of approximately 21 vol % oxygen, so the total theoretical volume for combustion is 100/21*12 mole=57.143 mole air per mole petrol.

Theoretical

Petrol 1 mole; 22.4 liter; 112 g. Air 57.143 mole; 1280 liter; 112 g and 1280*1.2766 (kg/m$^3$) 634 g.

Lower explosion limit, (1%)=maximum amount of air.

Petrol 1 liter, 5 g; Air 100 liter; 127.66 g; and 100/1000*1.2766 (kg/m$^3$).

Heat of combustion of 1 g petrol is 42.7 kJ/g; for 1 kg of air this minimal amount is: 1000/127.66*5=39.167 g petrol, with a combustion heat of: 39.167*42.7=1672.411 kJ.

In the calculations, the mass and volume added of the (combusted) fuel components are not taken into account since they are such a very small percentage of the total mass.

The average heat capacity of air from 20° C.-(1000 kPa) and 1500° C.-(3246 kPa) (after combustion) is in average 0.851295 kJ/(kg·K), the increase of temperature is from 556 K to 1800 K.

The heat absorbed by 1 kg of air from 556K to 1800K (ΔT is 1244K) is calculated at: 1 (kg)*0.851295 (kJ/(kg·K)) *1244 K=1059 kJ, this is only 1059/1672.4=63.3% of the combustion heat of petrol, but there is also another huge heat loss, the combusted gas that is exhausted is still very hot and contains a substantial amount of wasted heat (493.908 kJ/kg). The heat that eventually is converted to work is 1059−494=(only) 565 kJ/kg, the ultimate output of work of 565 kJ/kg is calculated by (this minimum of) 39.167 g of petrol with a combustion heat of 1672.411 kJ.

In practice this ratio is even worse caused by the internal friction losses of the engine, the remaining output of work is substantially reduced and the rate of conversion is decreased accordingly. Some other devices like the water circulation pump and radiator fan mounted on the engine further decrease the conversion rate of the Otto process cycle. The Otto process is listed in the following table 1 where combustion heat petrol is 42.7 kJ/g for 39.167 g of petrol this is 1672.4 kJ. Work output is 565 kJ/kg. Theoretical conversion rate with a maximum rate of air (is max. efficiency) is 565/1672.4=33.8%:

TABLE 1

| Temp (K) | Press. (kPa) | Density (kg/m³) | Int. Energy (kJ/kg) | Enthalpy (kJ/kg) | Entropy (kJ/kg-K) | Cv (kJ/kg-K) | Volume (m3) | Heat (kJ/kg) | Work/int (kJ/kg air) | Work tot (kJ/kg air) |
|---|---|---|---|---|---|---|---|---|---|---|
| 290 | 100 | 1.20148 | 330.973 | 414.204 | 3.83045 | 0.71770 | 0.000000 | | 0.000 | 0.000 |
| 290 | 100 | 1.20148 | 330.973 | 414.204 | 3.83045 | 0.71770 | 0.832307 | | 83.231 | 83.231 |
| 556.03 | 1000 | 6.24139 | 524.982 | 685.203 | 3.83045 | 0.75479 | 0.160221 | | −194.009 | −110.778 |
| 1800 | 3245.8 | 6.24139 | 1810.29 | 2130.35 | 4.83248 | 0.84780 | 0.160221 | 1058.985 | | |
| 1068.4 | 368.97 | 1.20148 | 942.232 | 1249.33 | 4.83248 | 0.86652 | 0.832307 | | 668.058 | 557.280 |
| 1068.4 | 368.97 | 1.20148 | 942.232 | 1249.33 | 4.83248 | 0.86652 | 0.832307 | | | |
| 764.94 | 100 | 0.45515 | 688.406 | 908.112 | 4.83248 | 0.80349 | 0.00000 | | −83.231 | 474.049 |
| 296 | 100 | 1.20148 | 330.973 | 414.204 | 3.83045 | 0.71770 | | 493.908 | | |

Figure 3A:
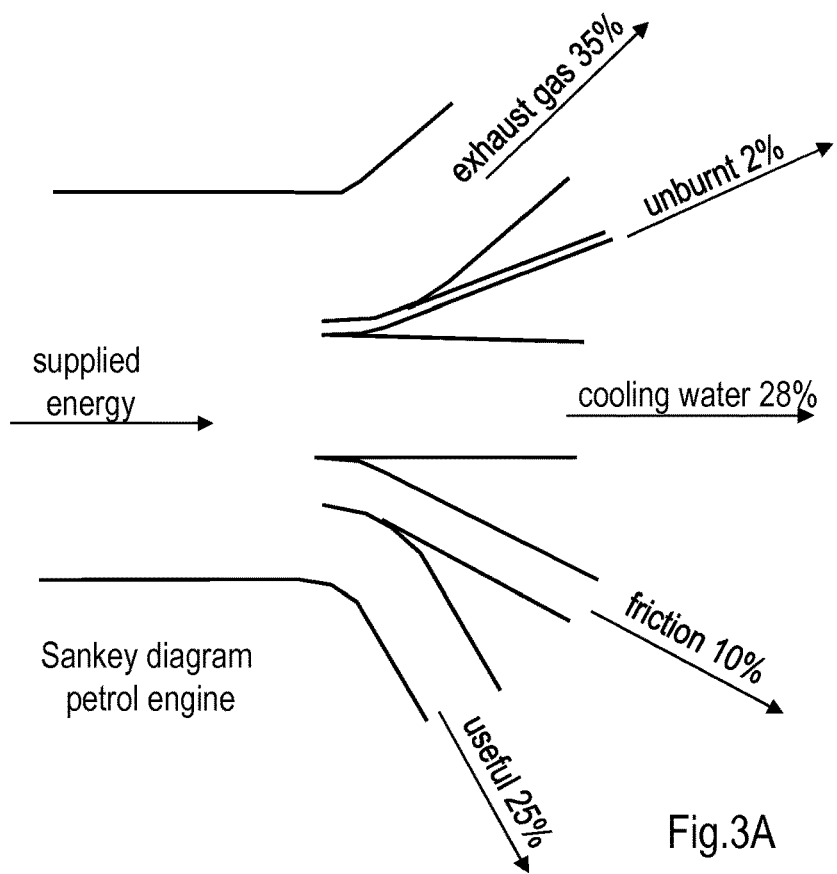
FIGS. 3A and 3B show Sankey diagrams of a petrol engine and a diesel engine.
Figure 3B:
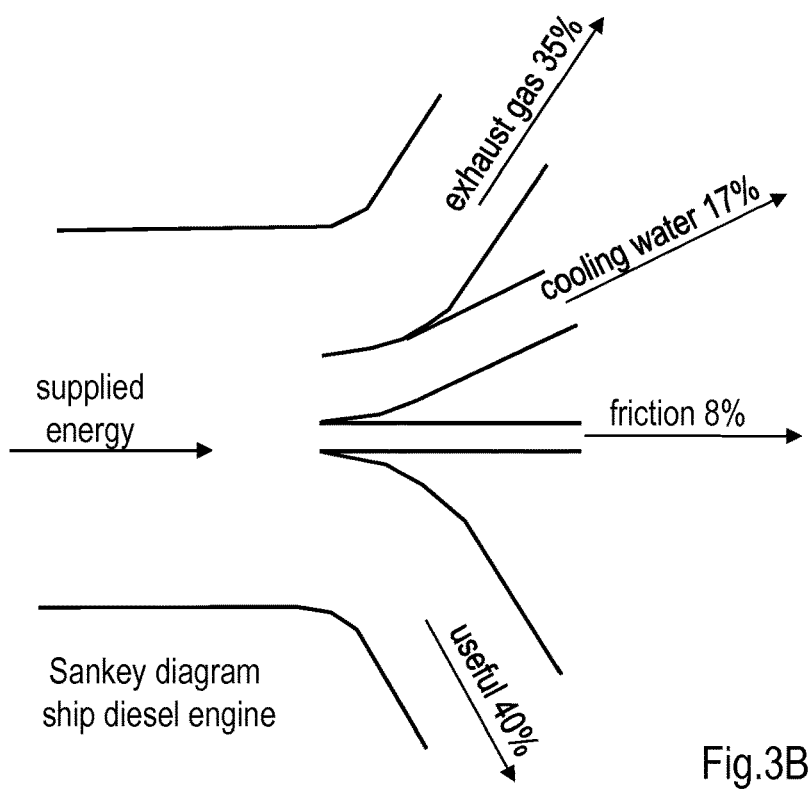
Figure 4:
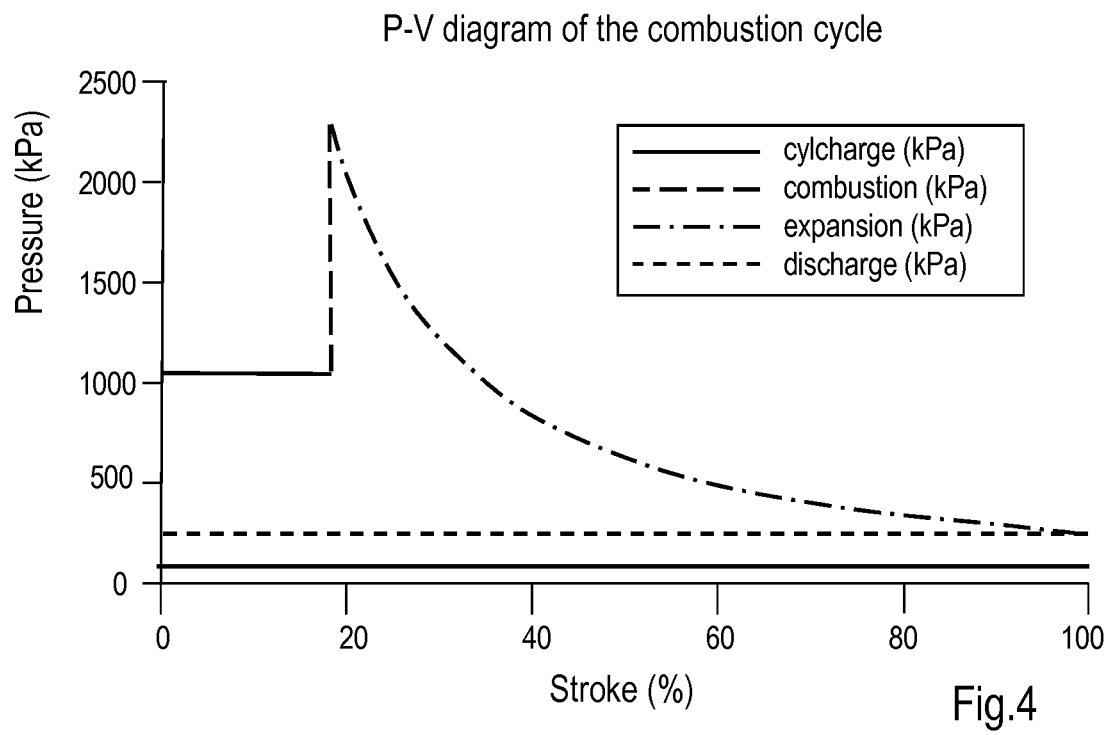
FIG. 4 shows a P-V diagram of the combustion cycle.

A Diesel combustion cycle is more efficient, this is mainly caused by the fact that the window of the explosion limits are widening at higher (engine) temperatures, see also FIG. 2. This results in a higher air percentage and relatively more heat that is able to be dissipated by (more) air. The heat transferred to the engine parts remains approximately the same as with the petrol engine, so the heat losses via the engine cooling are more or less equal to the heat losses by cooling of the petrol engine. The losses and output of work and heat of the petrol engine and diesel engine are presented by so called "Sankey" diagrams, shown in FIGS. 3A and 3B.

Engine components of the new type combustion engine is now discussed. The new type combustion engine has similarities with the existing petrol and diesel engine and has many engine components in common. In principle, a (prototype) engine can be constructed and built with nearly all well proven components and making use of the existing technology. In an embodiment, the new engine is a two-stroke engine with crankshaft, pistons with piston rods connected to the crankshaft, not much different as from the Otto or diesel engine.

The engine is equipped with intake and exhaust valves and two camshafts; both camshafts are driven by the crankshaft via a serrated belt or gear wheels.

One camshaft controls the opening of the exhaust valves; the other camshaft controls the opening timing of the intake valves. The angular rotation angle for opening the intake valves is fixed (this is with the piston in the most out position) but not the angle by which the valves are closed, this is depending on load and desired engine speed. The shape of the cam is made such that the angle of closing can be controlled by sliding the camshaft in length direction. Sliding does not affect the opening angle, only the angle of closing. This principle is also applied in the timing mechanism of the exhaust valves, the closing angle of the exhaust valves (also with the piston in the most out position) is fixed but not the opening angle, also the angle shift depending on engine speed and load is controlled by the shape of the cam and movement of the camshaft in length direction.

The individual controllable angular shift of both controllable camshafts is obtained via a control system equipped with a step motor arrangement.

An additional connection is made between the cylinder volumes via the cylinder head to comparable small pressure bottle(s) with controllable valves in between. Energy in the shape of compressed air can be stored during slow down and can be added during acceleration from and to the engine, a pneumatic low weight and low cost hybrid solution. The air in the pressure bottle(s) is also used to start the engine.

The engine is equipped with a turbo unit with a single expansion stage (turbine side) mechanically coupled to a four or five stages compression units with the air flow connected in series. An intercooler is mounted in between all compression stages except for the last one. The turbo provides compressed air with a pressure comparable to the pressure at the end of the compression stroke of the Otto cycle.

In an embodiment, the engine comprises a heat exchanger, which replaces the traditional radiator and water pump. The heat exchanger exchanges heat between the heat of the exhaust gasses flow from the cylinder(s) and the compressed air flow derived from the turbo unit.

A (standard) muffler may be used to damp the sound of the combustions; a dynamo with back up battery is mounted to provide for the electric vehicle supply.

Engine lubrication is configured in the same way as used by the petrol and diesel engines at present.

Starting the engine needs apart from pressurized air start also an additional new type component, an electric or fuel powered air intake heating unit, this component heats the intake air to a sufficient high temperature only during starting up.

The engine runs at a much higher average combustion temperature as a petrol or diesel engine, heat losses are limited as much as possible. For that reason a number of heat isolating measures are taken such as the use of ceramic coating and lining on cylinder walls, ceramic coating on the top of the pistons, the heat exposed planes of the cylinder head and the intake—and outlet valves. Drawings of the principles that are to be used are attached in one of the following chapters. One of the key materials is ceramic material.

Ceramic material has excellent properties for this application; the material is extremely hard, is comparable light in weight, has a super resistance to wear and has a very low heat transfer coefficient. There are a large number of ceramic materials available each with its specific properties. The right selection has to be made by investigation, consultancy of specialized companies and dedicated endurance tests.

An example to demonstrate the differences in properties of steel and an arbitrariness selected ceramic material (MgO) and Steel Ceramic (MgO).

The steel has a density (kg/m³) of 7.8; a max temp (K) of 1630; a heat conductivity of (W/(m·K)) 50 and a coefficient of thermal exp. $(K^{-1})*10^{-6}$ of 12. The steel ceramic has a density (kg/m³) of 2.8; a max temp (K) of 2200; a heat conductivity of (W/(m·K)) 7 (1000° C.) and a coefficient of thermal exp. $(K^{-1})*10^{-6}$ of 8.

In an embodiment, no water cooling of the engine is required by the condition that the heat conductivity and heat transfer is substantially reduced by thermal isolation measures and is matched to an acceptable engine block temperature or components attached to the engine block. This temperature, despite a lack of water cooling, need not be much higher than the engine block temperature of an existing petrol or diesel engine. Some (marginal) additional heat transfer to the environment or the (cold) exhaust gasses has to be accomplished from the engine block or attached components if this equilibrium cannot be reached, however, the transfer of heat from the hot gases to the engine parts has to be minimized to a very minimal extend.

In an embodiment, the engine is started with pressurized air from pressure bottle(s), the air is fed to the out stroking cylinders via the control valves between cylinder head and bottle(s). A small back up compressor is mounted to pressurize the bottle(s) in the event that there is no pressure left in the bottle(s).

In another embodiment, the new cycle does not have a compression stroke and, once running, the air is compressed by a quadruple or five stages turbo unit with an intercooler between each compression stage. The turbo unit is powered by the exhaust gasses of the engine. It is well know that the efficiency of a well-designed turbo unit is very high, even as high as 95%, less losses are to be considered by this configuration. The intake air is compressed with help of these turbo units and is cooled after each stage except for the last stage. The intake air is heated after the turbo units to a much higher temperature in counter current direction by the heat of the exhaust gasses.

The compressed and heated air is fed into the cylinder(s) via the intake valves in the cylinder head. The air input is fed to the cylinder during the piston is moving out. It needs to be mentioned that the (dead) volume of the cylinder with the piston in the top stroke position is made minimal. The compressed air derived from the turbo units and fed into the out stroking cylinder already generates work. The opening time of the intake valve is depending on the desired load and rotational speed of the engine.

The valve opens during a very short time (small rotation angle) at no load conditions and is opened for a defined maximum rotation angle for maximum load output and even further during start-up of the engine. This mechanism, the opening time of the intake valves combined with dosed fuel injection is related to the engine speed, turbo pressure and power take-of. In this way the speed and power output of the engine is controlled.

Fuel is injected in the cylinder just after the intake valve is closed, the air in the cylinder is very hot and the injected fuel (whatever kind of fuel) combusts spontaneously. The explosion range is very wide at this high temperature; the amount of air and fuel is controlled such that all heat of combustion is passed on to the air in the cylinder. It needs only a relative small amount of fuel to heat the air to the desired higher temperature since the air was already (very) hot by cylinder entrance. By measures taken to prevent leakage of heat to the surrounding parts, theoretically, but also nearly in practice, all heat of combustion is passed on to the air in the cylinder.

The piston strokes out after combustion; the exhaust gas expands and generates work. At the end of the stroke, the piston movement reverses and the (exhaust) gas is compressed to the required inlet pressure level of the turbo unit. This pressure level can already be present at exactly the outer stroke position of the piston (this is the maximum power output of the engine). At lower load conditions, the gas pressure in the cylinder at the end of the stroke is (far) below the required input pressure of the turbo turbine.

The exhaust valve is not opened at max stroke in this state; the valve is opened by the cams when the piston has compressed the exhaust gas to the required turbo turbine pressure level during the reverse stroke. The (rotational) camshaft angle relative to the crankshaft angle is controlled by the (electronic) camshaft angle positioning system to the optimal camshaft angle.

The flow and pressure of the exhaust gasses is converted to mechanical energy in the turbo unit, the energy content (pressure and flow) of the exhaust gasses is used to pressurize the intake air to the required pressure level. This process step already introduces work, the volume flow of the (hot) exhaust gasses is much higher as the volume flow of the (colder) intake air and hence the pressure drop of the exhaust gasses can be much smaller as the pressure increase of the intake air.

The exhaust gasses still contain much heat; this heat is passed on to the intake air after compression and is used in a very efficient way.

An overall analysis shows the following: A minor amount of heat is passed on to the environment by the intermediate air cooling of the turbo unit, this is a (minor) loss. The heat leakage from the engine is minimized or at least reduced by thermal isolating measures, this is also a (minor) loss. The exhaust gas temperature is just above the environmental temperature, this is also a (minor) loss. All heat losses together are only a very small part of the heat losses of a petrol or diesel engine, nearly all heat of combustion is converted to work.

The following tables lists the several steps in the combustion cycle. The first table is Table 2, showing compression and intermediate cooling of intake air. The table shows work in and heat out of the five stage turbo intake air compressor with quadruple intercooler.

TABLE 2

| Temp (K) | Pressure (kPa) | Density (kg/m$^3$) | Enthalpy (kJ/kg) | Entropy (kJ/kg-K) | Cv (kJ/kg-K) | Work (kJ/kg) | Heat (kJ/kg) |
|---|---|---|---|---|---|---|---|
| 290 | 100 | 1.20148 | 414.204 | 3.83045 | 0.717702 | | |
| 332.807 | 161.899 | 1.69541 | 457.204 | 3.83045 | 0.720179 | 43.000 | |
| 300 | 161.899 | 1.88053 | 424.128 | 3.72582 | 0.718288 | | 33.076 |
| 342.801 | 258.206 | 2.62354 | 467.128 | 3.72582 | 0.721085 | 43.000 | |
| 300 | 258.206 | 3.00004 | 423.91 | 3.59116 | 0.71852 | | 43.218 |
| 342.84 | 411.816 | 4.18389 | 466.91 | 3.59116 | 0.721359 | 43.000 | |
| 300 | 411.816 | 4.78695 | 423.564 | 3.4561 | 0.718891 | | 43.346 |
| 342.902 | 656.875 | 6.67241 | 466.564 | 3.4561 | 0.721794 | 43.000 | |
| 300 | 656.875 | 7.64081 | 423.013 | 3.32042 | 0.719481 | | 43.551 |
| 342.995 | 1047.83 | 10.6403 | 466.013 | 3.32042 | 0.722485 | 43.000 | |
| | | | | | | 215.000 | 163.191 |

Table 3 shows heating of intake air by the heat of exhaust gas.

TABLE 3

| Temp (K) | Pressure (kPa) | Density (kg/m$^3$) | Enthalpy (kJ/kg) | Entropy (kJ/kg-K) | Heat (kJ/kg) |
|---|---|---|---|---|---|
| 342.995 | 1047.83 | 10.6403 | 466.013 | 3.32042 | |
| 860 | 1047.83 | 4.22852 | 1013.24 | 4.28652 | 547.227 |

Table 4 shows air charging of the cylinder, combustion and expansion, generation of work and discharging of exhaust gas by a full engine load.

TABLE 4

| Temp (K) | Pressure (kPa) | Density (kg/m$^3$) | Int. Energy (kJ/kg) | Enthalpy (kJ/kg) | Entropy (kJ/kg-K) | Cv (kJ/kg-K) | Volume (m3) | Work (kJ/kg air) | Heat (kJ/kg air) |
|---|---|---|---|---|---|---|---|---|---|
| | | | properties of ambient air | | | | | | |
| 860 | 1047.83 | 4.22852 | 765.437 | 1013.24 | 4.28652 | 0.82563 | 0.000000 | 0.000 | |
| | | | cylinder charging | | | | | | |
| 860 | 1047.83 | 4.22852 | 765.437 | 1013.24 | 4.28652 | 0.82563 | 0.236489 | 247.801 | |
| | | | fuel injection and combustion | | | | | | |
| 1856.8 | 2263.88 | 4.22852 | 1664.28 | 2199.66 | 4.97438 | 0.95136 | 0.236489 | | 885.635 |
| | | | expansion, generation of work | | | | | | |
| 1060.5 | 235.5 | 0.75862 | 952.722 | 1263.16 | 4.97438 | 0.86855 | 1.318190 | 711.558 | |
| | | | discharge of the cylinder | | | | | | |
| 1080.5 | 235.5 | 0.75862 | 952.722 | 1263.16 | 4.97438 | 0.86855 | 0.000000 | −310.434 | |
| | | | | | | | Total | 648.925 | |

Table 5 shows turbo propulsion by the exhaust gasses.

TABLE 5

| Temp (K) | Pressure (kPa) | Density (kg/m$^3$) | Int. Energy (kJ/kg) | Enthalpy (kJ/kg) | Entropy (kJ/kg-K) | Cv (kJ/kg-K) | Work (kJ/kg) |
|---|---|---|---|---|---|---|---|
| 1080.46 | 235.5 | 0.758616 | 952.722 | 1263.16 | 4.974380 | 0.868554 | |
| 870 | 100 | 0.400199 | 774.104 | 1023.98 | 4.974380 | 0.827490 | 239.180 |

Table 6 shows the exchange of heat from the exhaust gasses to the intake air.

TABLE 6

| Temp (K) | Pressure (kPa) | Density (kg/m$^3$) | Int. Energy (kJ/kg) | Enthalpy (kJ/kg) | Entropy (kJ/kg-K) | Cv (kJ/kg-K) | Heat (kJ/kg) |
|---|---|---|---|---|---|---|---|
| 870 | 100 | 0.400199 | 774.104 | 1023.98 | 4.974380 | 0.827490 | |
| 352 | 100 | 0.989439 | 375.612 | 476.679 | 4.025670 | 0.721560 | 547.301 |

Efficiency and power output of the new cycle can be read from the tables, the efficiency factors related to the thermodynamic calculations such as the turbo efficiency and differential temperatures of the turbo inter coolers are taken into account.

The efficiency (ratio of work/heat) is: 648.925/885.635*100%=73.3%, this is excluding the mechanical efficiency (approx. 10% for a four stroke engine and 5% for a two stroke engine).

The power output of an engine running on this cycle is high. For example, the power output of a two liter engine running at 5000 R.P.M. is: 2 (liter)/1000 (l/m$^3$)*5000 (R.P.M.)/60 (s)=0.1667 m3/s on air; Mass air flow is 0.1667 (m$^3$/s)*4.22852 (kg/m$^3$)=0.705 kg/s of air; Power output is 0.705 (kg/s)*648.925 (kW/kg)=457.3 (kW) or 621.3 (Hp).

There is no theoretical restriction to increase the prime pressure to a higher value, a combustion pressure of 50-60 bar is not unusual, the related power output would go up to 1100 (kW) or 1500 (Hp), it would be a real challenge to construct a small engine with such an extreme high power output.

Storage and recuperation of kinetic vehicle energy is now discussed. It is of importance that the energy that is released by slowing down a vehicle can be applied to accelerate the vehicle in a next stage of operation. A system able to do so has to be relative small compact and has to have a comparable low weight.

A number of systems, each with its specific characteristics are analyzed for this purpose dedicated to this new type engine. It was found that a pneumatic system is favorite by far. With the programmable valve control of inlet and exhaust valves, the engine is able to perform as a programmable compressor and pneumatic motor. The only component that is missing and has to be added is an air pressure container. It is known from the diving industry that air containers made of carbon fiber are super light in weight. Calculations show that one or two containers with a content of 10 liter are sufficient to store the required amount of energy for hybrid car operation.

Figure 5:
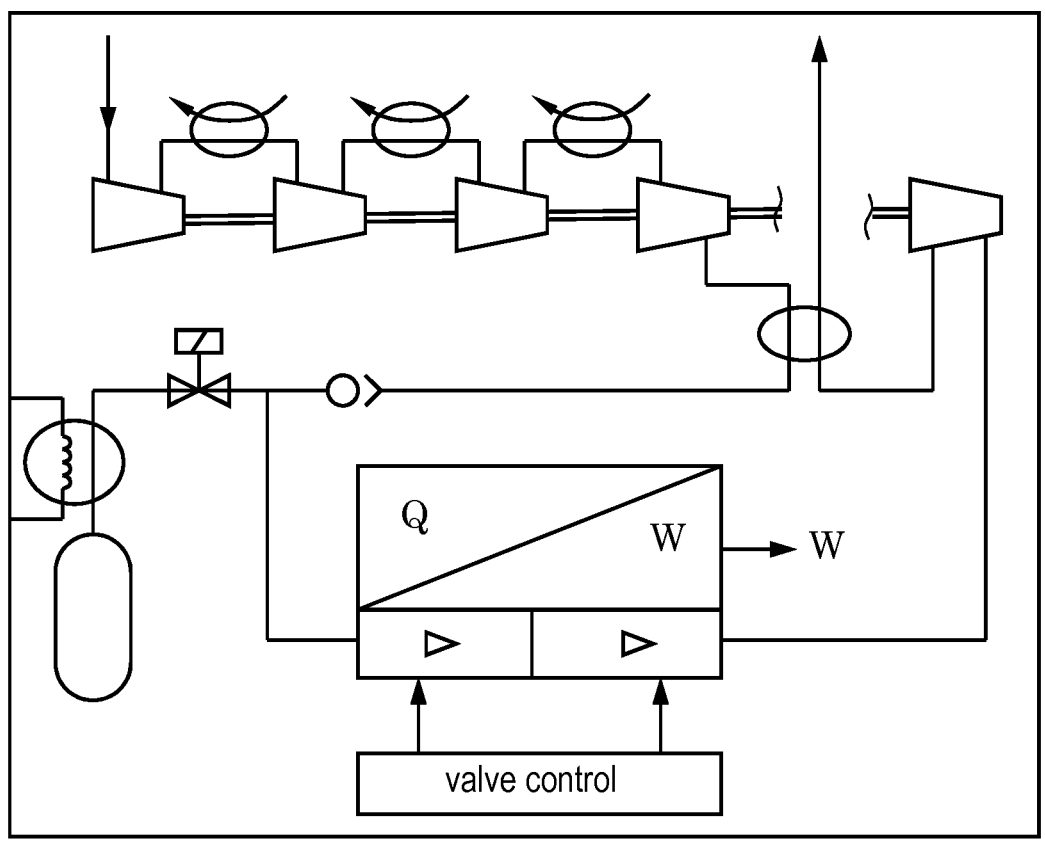
FIG. 5 is a diagram of an engine using the process set forth in this disclosure.

FIG. 5 is a diagram of an engine using the process set forth in this disclosure.

The working principle of an existing gas turbine is that air is accelerated to a high velocity by impellor blades mounted at the circumference of fast rotating impellor wheels. The air with high velocity is reduced in velocity and increases thereby in pressure in accordance with Bernoulli's law. The air velocity must be high since the density of air at lower pressure is very low and some pressure increase must be obtained.

A number of serial stages are required to derive the desired pressure level. Fuel is added to the compressed air and combust spontaneously under the conditions in a high temperature combustion chamber resulting in an increased temperature and related gas volume. This gas with high temperature and enlarged volume propels turbine wheels in the exhaust part of the turbine; the power output of the expanding exhaust gasses is substantially higher as the power input required for air compression.

There are two different types of gas turbines, one type converts the additional power to mechanical power and the other type converts the additional power in an exhaust gas velocity, an excellent manner to propel a jet plane. The discussion in this document is limited to the first type mentioned, whereby the generated additional power is converted to mechanical energy.

Commonly used gas turbines obtain their work output on conversion of gas velocity to force. These forces are acting on turbine blades and generate a torque. This torque multiplied by the rotational speed is the output of power of the gas turbine.

High gas velocities are required to generate effective forces. High gas velocities are also associated with relative high friction losses. A new principle is used in a new type gas turbine. In an embodiment, the gas turbine proceeds with a different principle to convert the heat content of the combusted gasses to work. In this new principle not the (very high) gas velocity but the potential energy of the gas is used instead. In contradiction with gravity generated by masses, with artificial gravity, always two different phenomena are present, potential energy and kinetic energy. They always come together. Potential energy (and also kinetic energy but that is not utilized) is related to the centrifugal force in a rotating system, this force acting over a certain radial stroke in a rotating system is an amount of work, this work is defined as potential energy. In this embodiment, the principle of the gas turbine is based on this principle.

A suitable gas flow in the turbine via a different type turbine wheel from the center of rotation to the circumference and increases in pressure depending on, amongst others, the rotational speed and gas density. The gas flows back with a some lower rotational speed from the circumference to the center due to a lower rotational speed of a same type of turbine wheel. Increasing the gas velocity is at cost of work, decreasing the rotating gas velocity feeds this work back to the drive of the rotating system. The rotating gas velocity is very high at the circumference. Although the rotational speed is very high, the velocity of the gas relative to the housing components is very low and hence also the friction losses. The passage at the circumference from gas out to gas in is with a relative low differential velocity and hence low friction losses. However, the reduction of kinetic energy is huge, this is demonstrated with the following example:

Rotational speed of the gas flow from the center to the circumference at the circumference is 100 m/s;

Rotational speed of the gas flow from the circumference to the center at the circumference is 80 m/s;

Differential speed is 20 m/s, the friction losses are related to this differential velocity of 20 m/s and not to a velocity of 80 m/s or 100 m/s The difference in kinetic energy is related to the second power of the velocity.

The kinetic energy of the gas with 100 m/s is related to $100^2 = 10000$.

The kinetic energy of the gas with 80 m/s is related to $80^2 = 6400$, this only 64%.

So a huge difference in kinetic and hence potential energy is derived with comparable very low friction losses.

The gas arrives at center at a higher pressure, with a number of stages in series the required pressure level is provided.

The principle can also be reversed so a differential pressure can be converted to work in a very efficient way.

It is a well-known fact that the conversion factor of a stand-alone gas turbine with mechanical power output is rather poor. This can be significantly be improved by using the wasted heat of the turbine used as an heat input for an ordinary steam cycle. The advantages of the gas turbine with a steam cycle in series; a very fast response time at short term is combined with a substantial higher conversion rate at longer term.

Such a configuration (STEG) is rather complex and still not optimized in terms of fuel efficiency. This relatively bad fuel efficiency is caused by the very high heat content of the exhaust gasses and the high gas velocities in the turbine resulting in substantial high friction losses both on the nozzles and guiding vanes in the turbine.

These high gas velocities are essential in this gas turbine concept since these multiplied by half the gas density are converted to mechanical work. The gas density is relatively low due to the rather high combustion temperature and the already low density of air.

Now discussed are the working principles of the very fuel efficient heat recycling gas turbine.

The first stage is discussed below. One difference between this process and a gas turbine is that the gas is cooled in between the several compression stages except for the last stage. This to maintain the gas at a lower temperature during compression resulting in a minimal amount of work required. An example for the compression process is listed in the Table 7 below (showing compression of air).

TABLE 7

| Temperature (K) | Pressure (kPa) | Density (kg/m³) | Enthalpy (kJ/kg) | Entropy (kJ/kg-K) | Work (kJ/kg) | Heat (kJ/kg) |
|---|---|---|---|---|---|---|
| 290 | 100 | 1.2015 | 416.34 | 3.8573 | | |
| 309.93 | 126.17 | 1.4182 | 436.34 | 3.8573 | | |
| | | | | | 20.000 | |
| 309.93 | 126.27 | 1.4194 | 436.34 | 3.8571 | | |
| 290 | 126.27 | 1.5173 | 416.27 | 3.7901 | | |
| | | | | | | 20.070 |
| 290 | 126.27 | 1.5173 | 416.27 | 3.7901 | | |
| 309.93 | 159.32 | 1.7911 | 436.27 | 3.7901 | | |
| | | | | | 20.000 | |
| 309.93 | 159.32 | 1.791 | 436.27 | 3.7901 | | |
| 290 | 159.32 | 1.9147 | 416.19 | 3.7232 | | |
| | | | | | | 20.080 |

The table may go on, up to a pressure of 102.1 kPa. A fuller table is shown in Table 13 below.

The end results are summarized in the Table 8 below, there are 20 stages of 20 kJ per compressions stage required to achieve the desired air pressure of 1024.1 kPa.

TABLE 8

| Temperature (K) | Pressure (kPa) | Density (kg/m³) | Enthalpy (kJ/kg) | Entropy (kJ/kg-K) | Work (kJ/kg) | Heat (kJ/kg) |
|---|---|---|---|---|---|---|
| 290 | 100 | 1.2015 | 416.34 | 3.8573 | | |
| 310.08 | 1024.1 | 11.527 | 434.62 | 3.2511 | | |
| | | | | | 163.604 | 181.684 |

The heating of compressed air is now discussed. After compression, the input air is heated in counter current direction by exchanging the heat of the exhaust gasses of the turbine. This is a new aspect in the process of a gas turbine. Heat is exchanged in accordance with the figures listed in the following Table 9.

TABLE 9

| Temperature (K) | Pressure (kPa) | Density (kg/m³) | Enthalpy (kJ/kg) | Entropy (kJ/kg-K) | Work (kJ/kg) | Heat (kJ/kg) |
|---|---|---|---|---|---|---|
| 310.08 | 1024.1 | 11.527 | 434.62 | 3.2511 | | |
| 1136.6 | 1024.1 | 3.0937 | 1346.1 | 4.6511 | | |
| | | | | | | 911.5 |

Combustion is now discussed. The heated air flows in the next process step to a combustion chamber; fuel is injected in the very hot air and combusts spontaneously. A mixture of hydro-carbons and air has to be within certain explosion limits, but these limits are widening at higher temperatures and at this high temperature nearly every composition allows for auto ignition. The amount of fuel injected determines the temperature in the combustion chamber. This temperature is limited to 1975.5 K (1702.5° C.) in this calculation example, this to expected material constrains.

The air absorbs all heat of combustion and increases not only in temperature but also substantially in volume. It is assumed that combustion in the combustion chamber is at constant pressure.

The expansion and generation of work will now be discussed. The air with a minor amount of combusted fuel components (not counted in the calculations) is guided to the second set of expansion impeller wheels and is expanded over a large number of expansion stages. The compression- and expansion impellers are mounted on a common shaft, the expansion impellers propels directly the compression impellers. The expansion impellers are configured in opposite way as the compression impellers; every stage generates work and ad this work to the shaft. The expansion of hot air is listed in the following Table 10.

TABLE 10

| Temperature (K) | Pressure (kPa) | Density (kg/m³) | Enthalpy (kJ/kg) | Entropy (kJ/kg-K) | Work (kJ/kg) |
|---|---|---|---|---|---|
| 1975.5 | 1024.1 | 1.8023 | 2348.1 | 5.3060 | |
| 1136.6 | 100.0 | 0.30634 | 1330.4 | 5.3060 | 1017.7 |

From the figures in the table one can conclude that an amount of work of 1017.7 kJ is generated but the exhaust gasses are still very hot at the end of expansion (100 kPa, the atmospheric pressure). They contain the heat that is used to heat the air after compression. The expansion of 1017.7 kJ is expanded in 50 stages of 20.354 kJ each (this are 20 impeller wheels in this calculations)

The heat content of exhaust gas will now be discussed. The (wasted) heat content of the exhaust gasses departing the turbine are listed in the following Table 11:

TABLE 11

| Temperature (K) | Pressure (kPa) | Density (kg/m³) | Enthalpy (kJ/kg) | Entropy (kJ/kg-K) | Work (kJ/kg) | Heat (kJ/kg) |
|---|---|---|---|---|---|---|
| 310.08 | 100 | 1.1235 | 436.55 | 3.9247 | | |
| 290 | 100 | 1.2015 | 416.34 | 3.8573 | | |
| | | | | | | 20.21 |

The energy balance shows the theoretical efficiency of the heat recycling gas turbine in Table 12.

TABLE 12

| ENERGY BALANCE | (kJ/kg) |
|---|---|
| Input of (combustion) heat | 1002.0 |
| Output of compression heat | 181.7 |
| Output of exhaust heat | 20.21 |
| Nett input of heat | 800.1 |
| Output of work | 1000.1 |
| Input of work | 200.0 |
| Nett output of work | 800.1 |

| Thermal efficiency factor | (%) |
|---|---|
| 800.1/1002.0 = | 79.850 |

The theoretical thermal efficiency is nearly 80%, this is incredible high and this can even be higher at higher combustion temperatures.

Thermodynamic properties of air during ten stages of compression and gas cooling between the several stages is shown in Table 13.

TABLE 13

| Temperature (K) | Pressure (kPa) | Density (kg/m³) | Enthalpy (kJ/kg) | Entropy (kJ/kg-K) | Work (kJ/kg) | Heat (kJ/kg) |
|---|---|---|---|---|---|---|
| 290 | 100 | 1.2015 | 418.34 | 3.8573 | | |
| 309.93 | 126.17 | 1.4182 | 438.34 | 3.8573 | | |
| | | | | | 20.000 | |
| 309.93 | 126.27 | 1.4194 | 438.34 | 3.8571 | | |
| 290 | 126.27 | 1.5173 | 418.27 | 3.7901 | | |
| | | | | | | 20.070 |
| 290 | 126.27 | 1.5173 | 418.27 | 3.7901 | | |
| 309.93 | 159.32 | 1.7911 | 438.27 | 3.7901 | | |
| | | | | | 20.000 | |
| 309.93 | 159.32 | 1.791 | 438.27 | 3.7901 | | |
| 290 | 159.32 | 1.9147 | 418.18 | 3.7232 | | |
| | | | | | | 20.080 |
| 290 | 159.32 | 1.9147 | 418.18 | 3.7232 | | |
| 309.93 | 200.97 | 2.2594 | 436.18 | 3.7232 | | |
| | | | | | 20.000 | |
| 309.93 | 200.97 | 2.2595 | 436.18 | 3.7232 | | |
| 290 | 200.97 | 2.4156 | 416.08 | 3.8562 | | |
| | | | | | | 20.100 |
| 290 | 200.97 | 2.4156 | 416.08 | 3.8562 | | |
| 309.94 | 253.53 | 2.8508 | 438.08 | 3.8562 | | |
| | | | | | 20.000 | |
| 309.94 | 253.53 | 2.8508 | 438.08 | 3.8562 | | |
| 290 | 253.53 | 3.048 | 415.96 | 3.5831 | | |
| | | | | | | 20.120 |
| 290 | 253.53 | 3.048 | 415.96 | 3.5831 | | |
| 309.95 | 313.88 | 3.5967 | 435.96 | 3.5831 | | |
| | | | | | 20.000 | |

TABLE 13-continued

| Temperature (K) | Pressure (kPa) | Density (kg/m³) | Enthalpy (kJ/kg) | Entropy (kJ/kg-K) | Work (kJ/kg) | Heat (kJ/kg) |
|---|---|---|---|---|---|---|
| 309.95 | 313.88 | 3.5968 | 435.96 | 3.5831 | | |
| 290 | 313.88 | 3.8454 | 415.8 | 3.5219 | | |
| | | | | | | 20.150 |
| 290 | 313.88 | 3.8454 | 415.8 | 3.5219 | | |
| 309.97 | 403.55 | 4.5384 | 435.8 | 3.5219 | 20.000 | |
| 309.97 | 403.55 | 4.5384 | 435.8 | 3.5219 | | |
| 290 | 403.56 | 4.8543 | 415.6 | 3.4545 | | |
| | | | | | | 20.200 |
| 290 | 403.56 | 4.8543 | 415.6 | 3.4545 | | |
| 309.99 | 509.3 | 5.7285 | 435.6 | 3.4545 | 20.000 | |
| 309.99 | 509.3 | 5.7285 | 435.6 | 3.4545 | | |
| 290 | 509.3 | 5.1289 | 415.35 | 3.387 | | |
| | | | | | | 20.250 |
| 290 | 509.3 | 5.1289 | 415.35 | 3.387 | | |
| 310.02 | 542.56 | 7.2298 | 435.35 | 3.387 | 20.000 | |
| 310.02 | 542.56 | 7.2298 | 435.35 | 3.387 | | |
| 290 | 542.56 | 7.7378 | 415.03 | 3.3192 | | |
| | | | | | | 20.320 |
| 290 | 542.56 | 7.7378 | 415.03 | 3.3192 | | |
| 310.05 | 811.2 | 9.1278 | 435.03 | 3.3192 | 20.000 | |
| 310.05 | 811.2 | 9.1278 | 435.03 | 3.3192 | | |
| 290 | 811.2 | 9.7728 | 414.82 | 3.2511 | | |
| | | | | | | 20.410 |
| 290 | 811.2 | 9.7728 | 414.82 | 3.2511 | | |
| 310.05 | 1024.1 | 11.528 | 434.82 | 3.2511 | 20.000 | |
| | | | | | 200.000 | 181.720 |

The difference in energy level is 20 kJ/kg per compression stage. Cooling of air is accomplished in between the compression stages.

The Thermodynamic properties of air during twenty stages of expansion are reflected in Table 14.

TABLE 14

| Temperature (K) | Pressure (kPa) | Density (kg/m³) | Enthalpy (kJ/kg) | Entropy (kJ/kg-K) | Work (kJ/kg) |
|---|---|---|---|---|---|
| 1975.5 | 1024.1 | 1.8023 | 2348.1 | 5.3060 | |
| 1136.6 | 100 | 0.30634 | 1330.4 | 5.3060 | |
| | | | | | 1017.7 |

The work of 1017.7 kJ/kg is generated in 20 stages of expansion, this is 1017.7/20=50.885 kJ/kg of air per expansion stage.

The embodiments described above are preferred embodiments and the elements of these embodiments, although presented in combination, can be employed separately or in other combinations comprising fewer of these elements and/or further elements not specified above, while providing at least in part one or more advantages of the present invention.

It is to be understood, however, that even though numerous characteristics and advantages of the present invention have been set forth in the foregoing description, together with details of the method, composition and function of the invention, the disclosure is illustrative only, and changes may be made in detail, within the principles of the invention to the full extent indicated by the broad general meaning of the terms in which the appended claims are expressed.

The invention claimed is:

1. A process for generating work via a combustion cycle, comprising:
    compressing an oxidator,
    feeding the compressed oxidator to a combustion chamber and generating work using the compressed oxidator prior to combusting,
    mixing the oxidator with a reductor in the combustion chamber,
    causing the mixture of the oxidator with the reductor to ignite and combust in the combustion chamber using heat,
    allowing the ignited mixture of the oxidator with the reductor to combust and expand to generate work,
    exchanging heat between the expanded and combusted mixture and a further compressed oxidator to be provided to the combustion chamber, and
    exhausting the expanded and combusted mixture.

2. The process according to claim 1, wherein the oxidator is compressed prior to ignition and heat is exchanged between the expanded and combusted mixture and the compressed oxidator prior to ignition.

3. The process according to claim 1, wherein the mixture of the oxidator and the reductor is compressed and heat is exchanged between the expanded and combusted mixture and the further compressed oxidator prior to compression of a non-combusted mixture of the further compressed oxidator and a further reductor.

4. The process according to claim 1, wherein the oxidator is cooled during its compression.

5. The process according to claim 1, wherein the amount of the reductor added is matched to the oxidator such that at most 20% of the heat generated during combustion is removed, during expansion.

6. The process according to claim 1, wherein, during heat exchange, the expanded and combusted mixture cools to a temperature of 320 K or less.

7. The process according to claim 1, wherein the expanded and combusted mixture reaches a temperature of at least 1500 K.

8. The process according to claim 1, having an efficiency of at least 70%.

9. The process according to claim 1, wherein energy of the expanded and combusted mixture is employed to compress the oxidator.

10. A device for generating work, comprising:
    a compressor configured to compress an oxidator, feed the compressed oxidator to a combustion chamber and generate work using the compressed oxidator,
    the combustion chamber being configured to, after work is generated using the compressed oxidator prior to combusting, combust a mixture of the oxidator and a reductor and allowing combusting and/or combusted mixture to expand, and
    a heat exchanger configured to receive the expanded and combusted mixture from the combustion chamber and transfer heat from the expanded and combusted mixture to a further compressed oxidator leaving the compressor to be provided to the combustion chamber.

11. The device according to claim 10, wherein the compressor is provided with an intercooler to remove compression heat.

12. The device according to claim 11, wherein the compressor comprises a plurality of stages and at least some of the stages are provided with an intercooler.

13. The device according to claim 10, wherein the device comprises a two stroke piston engine.

14. The device according to claim 13, wherein the combustion chamber comprises a cylinder, wherein a piston is reciprocatingly accommodated in the cylinder, and at least one intake valve, at least one exhaust valve, and a camshaft is configured to operate the at least one intake valve and the at least one exhaust valve, wherein at least a closing of the at least one intake valve and/or an opening of the at least one exhaust valve are variable.

15. The device according to claim 14, wherein opening and/or closing of the at least one intake valve is arranged to allow compressed oxidator to enter the cylinder at or near of a stroke removed from, top dead center (TDC) of the piston.

16. The device according to claim 13, comprising an accumulator to temporarily store compressed gas.

17. The device according to claim 10, wherein the device comprises a gas turbine with a turboshaft.

18. The device according to claim 10, wherein the combustion chamber comprises a cylinder, wherein a piston is reciprocatingly accommodated in the cylinder and at least one intake valve and a valve controller coupled to the at least one intake valve.

19. The device according to claim 18 wherein the valve controller comprises a camshaft.

20. The device according to claim 10, wherein the combustion chamber comprises a cylinder, wherein a piston is reciprocatingly accommodated in the cylinder and at least one exhaust valve and a valve controller coupled to the at least one exhaust valve.

* * * * *